United States Patent [19]

Hilden

[11] 3,720,859

[45] March 13, 1973

[54] IMAGE DISPLAY SYSTEM

[75] Inventor: Richard H. Hilden, Minneapolis, Mich.

[73] Assignee: Dicomed Corporated, Minneapolis, Minn.

[22] Filed: May 4, 1970

[21] Appl. No.: 34,120

[52] U.S. Cl. ........................315/23, 315/24, 315/25

[51] Int. Cl. ..............................................H01j 29/70

[58] Field of Search..........315/23, 24, 25; 340/324 A

[56] References Cited

UNITED STATES PATENTS

| | | | |
|---|---|---|---|
| 3,336,497 | 8/1967 | Osborne | 315/21 CH |
| 3,422,304 | 1/1969 | Thorpe | 315/24 |
| 3,447,020 | 5/1969 | Seats | 313/91 |
| 3,385,990 | 5/1968 | McNaney | 315/25 |

*Primary Examiner*—Benjamin A. Borchelt
*Assistant Examiner*—S. C. Buczinski
*Attorney*—Merchant & Gould

[57] ABSTRACT

An image display system wherein control means are connected to a dark trace storage cathode ray tube to control the electrode beam deflection of the cathode ray tube to produce plurality of individually-spaced, dot-sized, minor rasters. The minor rasters are spaced uniformly over the face of the cathode ray tube to produce a major raster. The intensity of the cathode ray tube electron beam is switched between an off condition and an on condition in response to input intensity signals. An input intensity signal is supplied to control the intensity level of each minor raster. The input intensity signal controls the amount of time that the electron beam is on during each minor raster so that the electron beam paints a particular intensity level for each minor raster. The picture displayed on the cathode ray tube is formed from the plurality of minor rasters, each having its own light absorption characteristic to alter the transmission of light to form an overall picture.

18 Claims, 8 Drawing Figures

INVENTOR.
RICHARD H. HILDEN
BY
Merchant & Gould
ATTORNEYS

INVENTOR.
RICHARD H. HILDEN
BY
Merchant & Gould
ATTORNEYS

INVENTOR.
RICHARD H. HILDEN
BY
Merchant & Gould
ATTORNEYS

INVENTOR.
RICHARD H. HILDEN
BY
Merchant & Gould
ATTORNEYS

INVENTOR.
RICHARD H. HILDEN
BY Merchant & Gould
ATTORNEYS

IMAGE DISPLAY SYSTEM

BACKGROUND OF THE INVENTION

This invention pertains to image display systems and more directly to digital image displays intended for use in any image analysis application requiring rapid output and prolonged retention of images for direct operator viewing. The present invention finds particular applicability in the fields of communication, weather forecasting, and medicine, and is particularly useful in X-ray analysis and computer-aided diagnosis.

With the world's ever-increasing population and the growing shortage of doctors, particularly highly-trained medical specialists, it has become necessary for doctors and hospitals to relay on advanced diagnostic instrumentation to help speed the diagnosis of the patient's medical problem.

With modern electronic computers it is possible to store tremendous amounts of medical information in relatively small space, and to recall this information for analysis at will.

It is also possible to scan a patient's X-ray and reduce the X-ray to digital information which can be transmitted to a remote point for reproduction and viewing, or which can be stored in a computer for future recall. One problem with X-ray scanning and reproduction has been the accuracy of reproduction when the digital X-ray information is transmitted or recalled from a computer. If X-ray information is to be stored or transmitted, it is essential that an accurate reproduction of the X-ray be reproduced when needed. Further, since medical specialists are not available in all areas of the country, it is essential that medical information, such as X-ray information, of a patient in one area of the country can be transmitted, for example by means of telephone lines, to a specialist in another area of the country for diagnostic analysis. Again, it is essential that the reproduced image be an accurate reproduction of the patient's X-ray. Any error in the reproduction might result in an inaccurate diagnosis which could be fatal to the patient

PRIOR ART

Prior art display systems available today suffer from serious limitations which makes it impractical or impossible to utilize them for transmission of image information, such as X-rays.

For example, the resolution obtainable with television, or with wire photos is not high enough to be utilized in accurate X-ray reproduction. Furthermore, television cannot be transmitted between two points in digital form, nor will it retain its image without continual transmission.

Alpha numeric displays can only be utilized for the transmission of text material, and cannot transmit lined drawings. Furthermore, alpha numeric displays do not have sufficiently accurate tonal quality or resolution for the transmission of X-rays.

Graphic displays can be utilized in the transmission of lined drawings, but are merely an on-off or two level intensity, and there is no tonal quality to this type of display, which precludes its use in the transmission of X-ray images.

Another disadvantage of both the prior art alpha numeric and graphic displays is that both of these systems require periodic refreshing in order to maintain a displayed image.

SUMMARY OF THE PRESENT INVENTION

In the image display system of the present invention, the image is reproduced on a dark trace storage cathode ray tube of the type disclosed in Seats' U.S. Pat. No. 3,447,020. The dark trace storage cathode ray tube has a target element or screen within the cathode ray tube that is normally translucent, and a back lighting source is mounted behind the cathode ray tube so that the illuminating rays are visible through the target element and the cathode ray tube face plate. The cathode ray tube target element, or screen, is covered with a coating of crystals which turn dark, or opaque, when bombarded by the electrons from the electron beam of the cathode ray tube. Once a portion of the target screen has been bombarded by electrons and has turned opaque, that portion of the screen will remain opaque until some action is taken to erase the image from the screen or to return the screen to its normal translucent condition. In the dark trace storage cathode ray tube utilized in the present invention, a heating coil is mounted inside the tube adjacent the target face or screen and energization of the heating coil causes erasure of the screen, in other words, causes the screen to return to its normal translucent state.

The cathode ray tube has a major deflection coil and a minor deflection coil associated therewith and each of the major and minor deflection coils has a horizontal deflection input and a vertical deflection input.

A minor vertical deflection register, or counter, is connected to receive clock pulses from a clock pulse generator and to continually count from zero through its maximum count and then recycle to zero as long as it receives clock pulses. A minor horizontal deflection register, or counter, is connected to receive a pulse from the minor vertical deflection register each time the minor vertical deflection register has counted through a complete cycle. The minor horizontal deflection register will continue to count from zero to its maximum count and then recycle to zero as long as it continues to receive pulses from the minor vertical deflection register.

A major horizontal deflection register, or counter, is connected to receive a pulse each time the minor horizontal deflection register counts through a complete cycle. Finally, a major vertical deflection register, or counter, is connected so as to receive a pulse each time the major horizontal deflection register counts through a complete cycle.

Digital to analog converters are connected to each of the minor vertical, the minor horizontal, the major horizontal, and the major vertical registers. The digital analog convertors convert the count in each of these registers to an analog signal proportional to the count in each particular register. The analog signal of the digital analog converter which is proportional to the count in the minor vertical deflection register is connected to the vertical deflection input of the minor deflection coil. The analog signal from the output of the digital analog convertor which is proportional to the count in the minor horizontal deflection register is connected to the horizontal deflection input of the minor deflection coil. Similarly, the analog signal from the output of the digital analog convertor which is proportional to the count in the major horizontal deflection register is fed to the horizontal deflection input of the major deflection coil and the analog signal proportional to the count in the major vertical deflection register is connected to the vertical deflection input of the major deflection coil.

When all of the registers are at zero count and the minor vertical deflection register receives its first clock pulse the one count in the minor vertical deflection register will be converted to a proportional analog signal and fed to the vertical deflection input of the minor deflection coil. This signal will be such as to cause a minor vertical sweep in the upper left-hand corner of the target screen of the cathode ray tube. As the count in the minor vertical deflection register increases, the minor vertical sweep will increase in length in a vertical direction. When the minor vertical deflection register is at its maximum count, the minor vertical sweep will be at its maximum length. The next clock pulse will cause the minor vertical deflection register to reset to zero and to start recounting thereby tracing another minor vertical sweep. At the same time, however, a pulse will have been fed to the minor horizontal deflection register, and the count in the minor horizontal deflection register will be converted to an analog signal and will cause the second minor vertical sweep to move one minor space to the right on the target face. As each successive minor vertical trace is formed, it will be deflected horizontally one minor deflection until such time that the minor horizontal deflection register is full. When the minor horizontal deflection register is full, a minor raster will have been formed at the upper left-hand portion of the screen or target of the cathode ray tube.

The next clock pulse will reset both the minor vertical and minor horizontal deflection registers to zero and will cause the major horizontal deflection register to increment by one count. The count in the major horizontal deflection register will be converted to an analog signal and will cause a major horizontal deflection of the electron beam toward the right on the screen of the cathode ray tube. At the same time, another minor vertical deflection or trace will begin. This procedure continues until the major horizontal deflection register is full at which time a plurality of minor rasters will have been spaced horizontally along the top of the screen of the cathode ray tube. The next clock pulse will cause the minor vertical, the minor horizontal and the major horizontal registers to recycle to zero and will cause the major vertical deflection register to increment by one count. The count of the major vertical deflection register will be converted to an analog signal and applied to the vertical deflection input of the major deflection coil causing the electron beam to move vertically downwardly by one major deflection. The cycle then repeats with a second horizontal line of minor rasters being formed horizontally across the screen of the cathode ray tube. This procedure continues until the major horizontal and major vertical deflection registers are full, at which time the last minor raster will have been produced at the lower right-hand corner of the target or screen of the cathode ray tube, and the entire major raster will have been produced from a plurality of closely-spaced minor rasters.

The image display device of the present invention also has a data input which is adapted to receive digital signals indicative of intensity levels on an image to be formed on the dark trace storage cathode ray tube. A new digital intensity input signal is received each time both the minor vertical and minor deflection registers have counted through a complete cycle, or in other words, each time a minor raster has been formed. Each digital intensity input signal is fed to an intensity register and is stored therein. A digital comparator is connected to the intensity register and is also connected to the minor vertical deflection register and the minor horizontal deflection register, and the digital comparator compares the digital signals stored in the intensity register with the count in the minor vertical and minor horizontal deflection registers.

At the same time that a digital intensity input signal is supplied to the intensity register, the electron beam of the dark trace storage cathode ray tube is turned on so that the electron beam bombards the screen of the cathode ray tube. When there is coincidence between the count in the minor vertical and minor horizontal deflection registers and the digital intensity input signal in the intensity register, the comparator produces an output signal which turns off the electron beam of the dark trace storage cathode ray tube so that the electron beam no longer bombards the cathode ray tube screen. As can be seen, the intensity of each minor raster of the display produced on the face of the cathode ray tube will depend upon the value of the digital intensity input signal, which in turn controls how long the electron beam of the cathode ray tube is turned on. If the digital input signal represents a binary zero signal, there will be immediate coincidence between the count in the intensity register and the count in the minor vertical and minor horizontal deflection registers and the electron beam will not be turned on during the generation of that minor raster so that minor raster will remain translucent. If the digital intensity input signal is such that the electron beam is turned on for half of the time that a minor raster is generated, half of the minor raster will be opaque and the other half will be translucent. If the digital intensity input signal is such that the electron beam of the cathode ray tube is on during the entire time that a minor raster is generated, that particular minor raster will be completely opaque. By the time all of the minor rasters of a major raster have been generated, an image will be formed on the face of the dark trace storage cathode ray tube.

In the image display system of the present invention, the minor vertical and the minor horizontal deflection registers, or counters, are eight pulse counters, that is, the registers recycle every eight counts, and therefore there are 64 different levels of intensity at which each minor raster can be set. The major horizontal and the major vertical deflection registers, or counters, are 1,024 pulse counters, that is, each of these registers recycle after counting 1,024 pulses, and therefore, in the generation of each major raster there will be produced over 1 million minor rasters. The resolution of an image produced on the image display device of the present invention is produced from over 1 million separate intensity spots, and each of these more than 1 million intensity spots can have sixty-four different levels of intensity to control the tonal quality of the reproduced image.

It is one object of the present invention to provide an improved image display system.

It is another object of the present invention to provide an improved image display system in which the image is formed on a dark trace storage cathode ray tube.

A further object of the present invention is to provide an image display system utilizing a dark trace storage cathode ray tube with control means connected to control the electron beam deflection of said tube to produce a major raster from a plurality of individually-spaced minor rasters.

A still further object of the present invention is to provide an image display device which utilizes a dark trace storage cathode ray tube having a major raster display formed from a plurality of individually-spaced minor rasters, and where the intensity of each minor raster is determined by the length of time that the electron beam of the cathode ray tube is on during each minor raster.

Another object of the present invention is to provide an image display device which can be connected directly to other digital equipment and produce an image from digitally-stored information.

These and other objects of the present invention will become apparant to those skilled in the art upon consideration of the accompanying specification, claims and drawings.

DESCRIPTION OF THE DRAWINGS

Referring to the drawings wherein like numerals indicate like parts throughout the several views.

Figure 1:
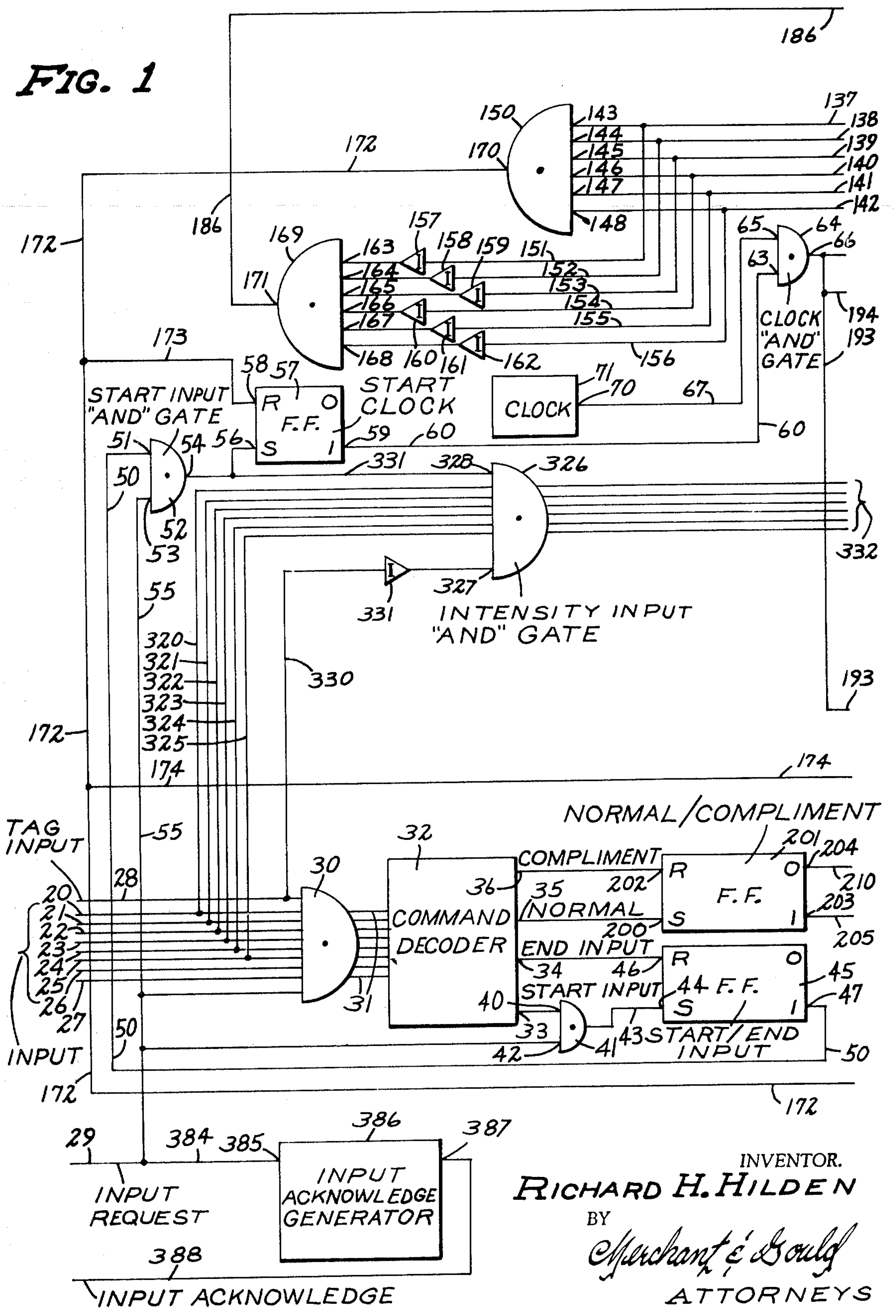
FIGS. 1, 2 and 3 illustrate portions of a schematic representation of an embodiment of the present invention.
Figure 2:
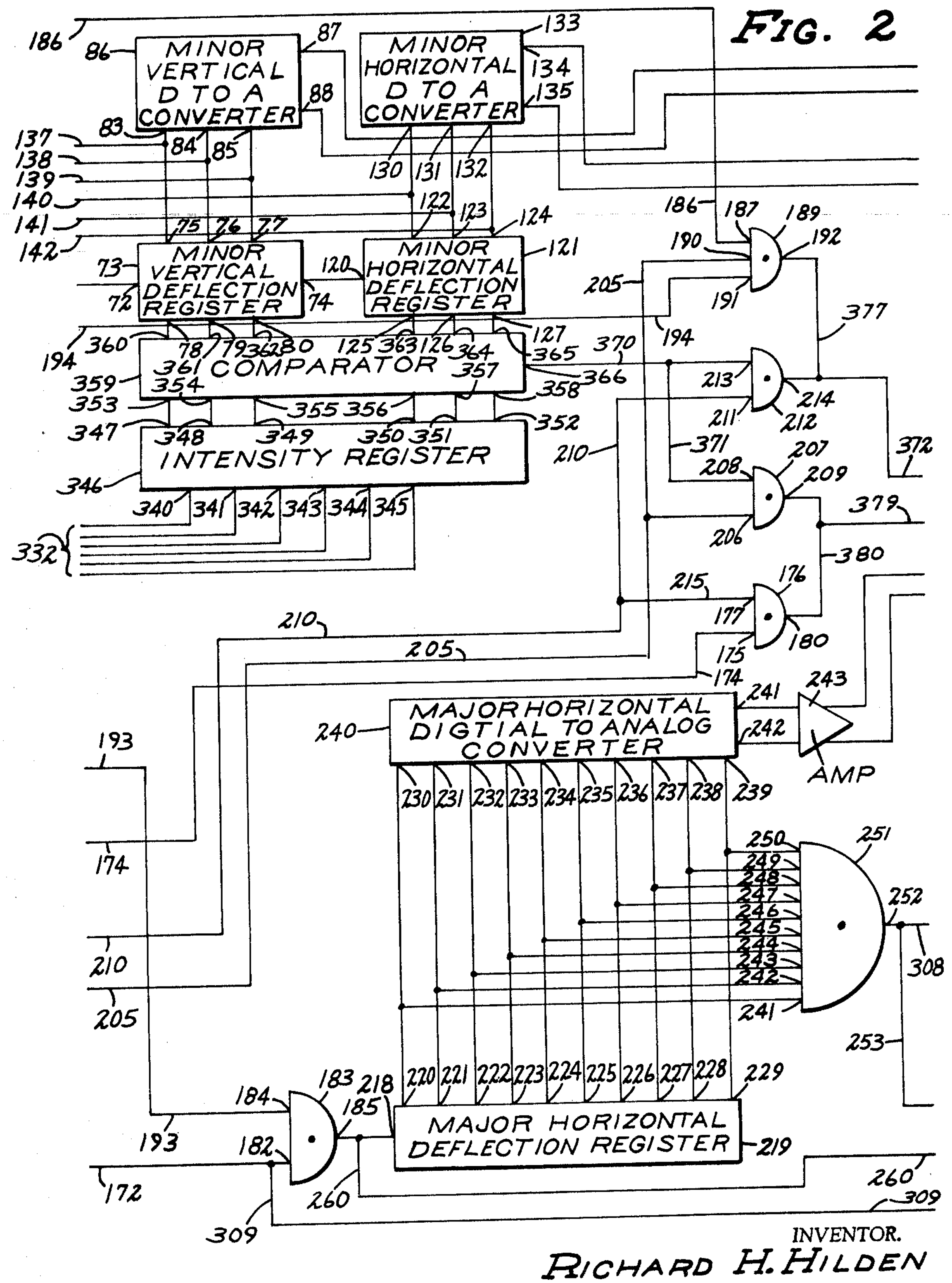
Figure 3:
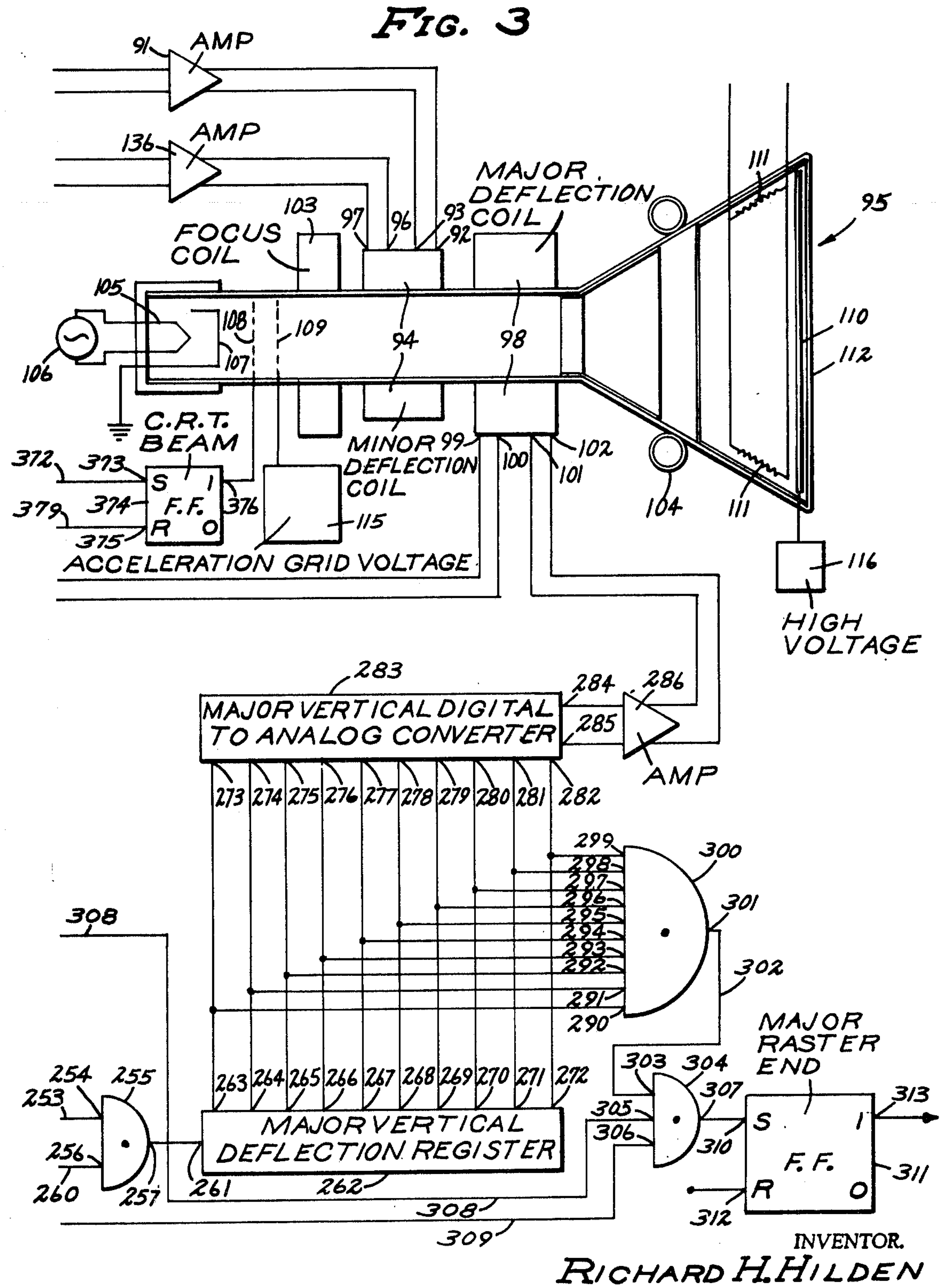

Referring to the drawings there is shown a plurality of digital input lines 20–29. Inputs 20–27 represent input lines for an eight-bit digital data word, the inputs are connected to the input of a COMMAND INPUT AND gate 30. Input 28, a TAG input, is also connected to the input of COMMAND INPUT gate 30 as is input 29, an INPUT REQUEST line.

COMMAND INPUT gate 30 has eight output lines indicated at 31, and the eight-bit input data word appears on these output lines when a signal is present on both the TAG input 28 and the INPUT REQUEST line 29 of COMMAND INPUT AND gate 30. The output lines 31 from COMMAND INPUT gate 30 are fed to a COMMAND DECODER 32. COMMAND DECODER 32 has a START INPUT output 33, an END INPUT output 34, a NORMAL output 35, and a COMPLEMENT output 36. The COMMAND DECODER 32 decodes the input data word imparted thereto and produces an output signal on one of its four outputs depending upon the value of the input data word.

The START INPUT output 33 of COMMAND DECODER 32 is connected to an input 40 of an AND gate 41. AND gate 41 further has an input 42 and an output 43. Input 42 of AND gate 41 is connected to the INPUT REQUEST line 29, while output 43 of AND gate 41 is connected to a SET input 44 of a START/END INPUT flip-flop 45. Flip-flop 45 has a RESET input 46 and a "1" output 47. RESET input 46 of flip-flop 45 is connected to the END INPUT output 34 of COMMAND DECODER 32.

Output 47 of START/END INPUT flip-flop 45 is connected by means of a conductor 50 to an input 51 of a START INPUT AND gate 52. Gate 52 further has an input 53 and an output 54. Input 53 of AND gate 54 is connected by means of a conductor 55 to the INPUT REQUEST line 29.

Output 54 of START INPUT AND gate 52 is connected to a SET input 56 of a START CLOCK flip-flop 57. Flip-flop 57 further has a RESET input 58 and a "1" output 59. Output 59 of START CLOCK flip-flop 57 is connected by means of a conductor 60 to an input 63 of a CLOCK AND gate 64. AND gate 64 further has an input 65 and an output 66. Input 65 of CLOCK AND gate 64 is connected by means of a conductor 67 to an output 70 of a CLOCK PULSE GENERATOR 71.

Output 66 of CLOCK AND gate 64 is connected to an input 72 of a three-bit MINOR VERTICAL DEFLECTION register, or counter, 73. MINOR VERTICAL DEFLECTION register 73 further has a pulse output 74, register read outputs 75, 76 and 77 and register read outputs 78, 79 and 80.

Outputs 75, 76 and 77 of MINOR VERTICAL DEFLECTION register 73 are respectively connected to inputs 83, 84 and 85 of a MINOR VERTICAL DIGITAL TO ANALOG convertor 86.

MINOR VERTICAL DIGITAL TO ANALOG convertor 86 has outputs 87 and 88 which are connected through an amplifier 91 to vertical deflection inputs 92 and 93 of a MINOR DEFLECTION coil 94 of a dark trace storage cathode ray tube indicated generally at 95. MINOR DEFLECTION coil 94 further has horizontal deflection inputs 96 and 97.

Cathode ray tube 95 further has a MAJOR DEFLECTION coil 98 having horizontal deflection inputs 99 and 100, and vertical deflection inputs 101 and 102.

Cathode ray tube 95 also has a FOCUS coil indicated generally at 103, and a source of back lighting in the form of a fluorescent bulb indicated generally at 104.

Cathode ray tube 95 has a filament 105 connected to a source of energizing potential 106, a cathode 107, a control grid 108, an acceleration grid 109, a target or screen 110, an ERASE heater coil 111, and a front face 112. Cathode 107 of cathode ray tube 95 is connected to ground, while acceleration grid 109 is connected to a source of acceleration grid voltage 115. The target or screen 110 of cathode ray tube 95 is connected to a source of high voltage 116, while the ERASE coils 111 are adapted to be connected to a source of energizing voltage (not shown).

It is to be understood that while electro-magnetic deflection and focus coils have been shown in association with the dark trace storage tube 95, that this is for the purpose of illustration only, and dark trace storage cathode ray tube 95 could just as readily utilize electrostatic deflection and focus elements.

Pulse output 74 of MINOR VERTICAL DEFLECTION register 73 is connected to a pulse input 120 of a MINOR HORIZONTAL DEFLECTION register, or counter, 121. MINOR HORIZONTAL DEFLECTION register 121 further has register read outputs 122, 123 and 124 and register read outputs 125, 126 and 127. Register read outputs 122, 123 and 124 of MINOR HORIZONTAL DEFLECTION register 121 are connected to inputs 130, 131 and 132 of a MINOR HORIZONTAL DIGITAL TO ANALOG convertor 133. MINOR HORIZONTAL DIGITAL TO ANALOG convertor 133 has outputs 134 and 135 which are connected through an amplifier 136 to the horizontal deflection inputs 96 and 97 of the MINOR DEFLECTION coil 94.

Register read outputs 75, 76 and 77 of MINOR VERTICAL DEFLECTION register 73 and register read outputs 122, 123 and 124 of MINOR HORIZONTAL DEFLECTION register 121 are respectively connected by means of conductors 137–142 to inputs 143–148 of an AND gate 150, and by means of conductors 137–142, conductors 151 through 156, and invertors 157 through 162 to inputs 163–168 of an AND gate 169. AND gate 150 further has an output 170, while AND gate 169 has an output 171. The output 170 is connected by means of a conductor 172 and a conductor 173 to the RESET input 58 of the START CLOCK flip-flop 57, and is connected by means of the conductor 172 and a conductor 174 to an input 175 of an AND gate 176. AND gate 176 further has an input 177 and an output 180.

Output 170 of AND gate 150 is further connected by means of conductor 172 to an input 182 of an AND gate 183. AND gate 183 further has an input 184 and an output 185.

Output 171 of AND gate 169 is connected by means of a conductor 186 to an input 187 of an AND gate 189. AND gate 189 further has an input 190, an input 191, and an output 192.

Input 184 of AND gate 183 is connected by means of a conductor 193 to the output 66 of the CLOCK AND gate 64. Output 66 of the CLOCK AND gate 64 is further connected by means of a conductor 194 to the input 191 of AND gate 189.

The NORMAL output 35 of COMMAND DECODER 32 is connected to a SET input 200 of a NORMAL/COMPLEMENT flip-flop 201. NORMAL/COMPLEMENT flip-flop 201 further has a RESET input 202, a "1" output 203 and a "0" output 204. RESET input 202 of flip-flop 201 is connected to the COMPLEMENT output 36 of COMMAND DECODER 32. The "1" output 203 of flip-flop 201 is connected by means of a conductor 205 to the input 190 of AND gate 189 and to an input 206 of an AND gate 207. AND gate 207 further has an input 208 and an output 209. The "0" output 204 of NORMAL/COMPLEMENT flip-flop 201 is connected by means of a conductor 210 to an input 211 of an AND gate 212. AND gate 212 further has an input 213 and an output 214. The "0" output 204 of NORMAL/COMPLEMENT flip-flop 201 is further connected by means of conductor 210 and a conductor 215 to the input 177 of AND gate 176.

The output 185 of AND gate 183 is connected to a pulse input 218 of a MAJOR HORIZONTAL DEFLECTION register, or counter, 219. MAJOR HORIZONTAL DEFLECTION register 219 is a 10-bit digital counter and has register read outputs 220–229, each output representing one bit of the digital count in the MAJOR HORIZONTAL DEFLECTION register 219. The register read outputs 220–229 of MAJOR HORIZONTAL DEFLECTION register 219 are respectively connected to inputs 230–239 of a MAJOR HORIZONTAL DIGITAL TO ANALOG convertor 240. MAJOR HORIZONTAL DIGITAL TO ANALOG convertor 240 has outputs 241 and 242 which are connected through an amplifier 243 to the horizontal deflection inputs 99 and 100 of the MAJOR DEFLECTION coil 98 of cathode ray tube 95.

Register read outputs 220–229 of MAJOR HORIZONTAL DEFLECTION register 219 are respectively connected to inputs 241–250 of an AND gate 251. AND gate 251 further has an output 252 which is connected by means of a conductor 253 to an input 254 of an AND gate 255. AND gate 255 further has an input 256 and an output 257. Input 256 of AND gate 255 is connected by means of a conductor 260 to the output 185 of AND gate 183.

Output 257 of AND gate 255 is connected to an input 261 of a MAJOR VERTICAL DEFLECTION register 262. MAJOR VERTICAL DEFLECTION register 262 is a 10-bit digital counter and has register read outputs 263–272, each output representing one bit of the digital count in the major vertical deflection register.

Register read outputs 263–272 of MAJOR VERTICAL DEFLECTION register 262 are respectively connected to inputs 273-282 of a MAJOR VERTICAL DIGITAL TO ANALOG convertor 283. MAJOR VERTICAL DIGITAL TO ANALOG convertor 283 further has outputs 284 and 285 which are connected by means of an amplifier 286 to the vertical deflection inputs 101 and 102 of the MAJOR DEFLECTION coil 98 of cathode ray tube 95.

Register read outputs 263–272 of MAJOR VERTICAL DEFLECTION register 262 are respectively connected to inputs 290–299 of an AND gate 300. AND gate 300 further has an output 301 which is connected by means of a conductor 302 to an input 303 of an AND gate 304. AND gate 304 further has an input 305, an input 306, and an output 307. Input 205 of AND gate 304 is connected by means of a conductor 308 to the output 252 of AND gate 251. Input 306 of AND gate 304 is connected by means of a conductor 309 and conductor 172 to the output 170 of AND gate 150.

Output 307 of AND gate 304 is connected to a SET input 310 of a MAJOR RASTER END flip-flop 311. MAJOR RASTER END flip-flop 311 further has a RESET input 312 and a "1" output 313. RESET input 312 of MAJOR RASTER END flip-flop 311 is adapted to be connected to a master reset signal (not shown).

Input lines 20–25, the six least significant bits of the data input word, are respectively connected by means of conductors 320–325 to inputs of an INTENSITY INPUT AND gate 326. INTENSITY INPUT AND gate 326 further has inputs 327 and 328. TAG input line 28 is connected by means of a conductor 330 and an invertor 331 to the input 327 of INTENSITY INPUT AND gate. Output 54 of START INPUT AND gate 52 is connected by means of a conductor 331 to the input 328 of INTENSITY INPUT AND gate 326.

INTENSITY INPUT AND gate 326 has six output lines indicated by the number 332, one line for each bit of the six-bit intensity input signal. The output lines of intensity input and gate 326 are connected to inputs 340–345 of an INTENSITY register 346. INTENSITY register 346 further has register read output lines 347–352 which are respectively connected to inputs 353–358 of a COMPARATOR 359. COMPARATOR 359 further has inputs 360–365 and an output 366. Inputs 360–362 of COMPARATOR 359 are respectively connected to the register read outputs 78–80 of MINOR VERTICAL DEFLECTION register 73, while inputs 363–365 of COMPARATOR 359 are respectively connected to register read outputs 125–127 of MINOR HORIZONTAL DEFLECTION register 121. The output 366 of COMPARATOR 359 is connected by means of a conductor 370 to the input 213 of AND gate 212, and by means of conductor 370 and a conductor 371 to the input 208 of AND gate 207.

Output 214 of AND gate 212 is connected by means of a conductor 372 to a SET input 373 of a CATHODE RAY TUBE BEAM flip-flop 374. Flip-flop 374 further has a RESET input 375, and a "1" output 376. Output 192 of AND gate 189 is connected by means of a conductor 377 and a conductor 372 to the SET input 373 of flip-flop 374.

Output 209 of AND gate 207 is connected by means of a conductor 379 to the input 375 of flip-flop 374, while output 180 of AND gate 176 is connected by means of a conductor 380 and the conductor 379 to the RESET input 375 of flip-flop 374.

The "1" output 376 of CATHODE RAY TUBE BEAM flip-flop 374 is connected to the control grid 108 of cathode ray tube 95.

INPUT REQUEST line 29 is connected by means of a conductor 384 to an input 385 of an INPUT ACKNOWLEDGE generator 386. INPUT ACKNOWLEDGE generator 386 further has an output 387 which is connected to an input acknowledge line 388.

Figure 4:
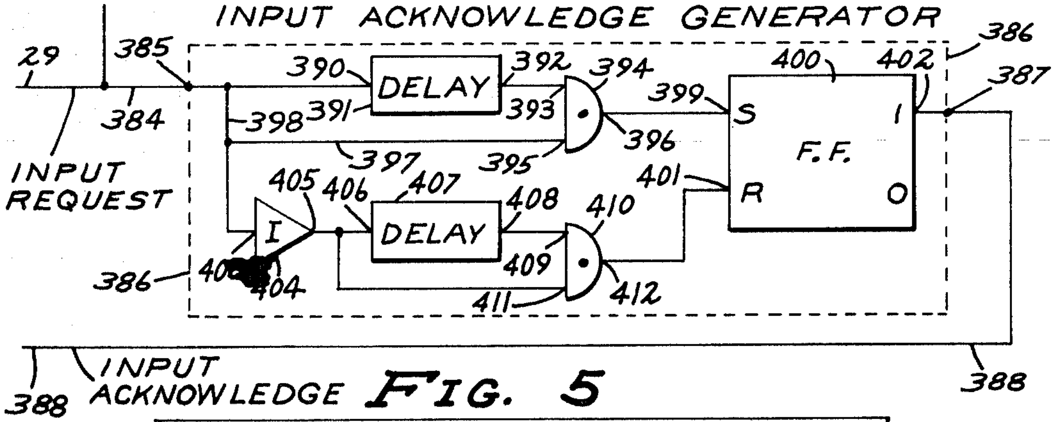
FIG. 4 is a schematic representation of an input-acknowledged generator circuit utilized in the present invention.

Referring to FIG. 4 there is shown a schematic representation of the INPUT ACKNOWLEDGE generator 386. Input 385 of INPUT ACKNOWLEDGE generator 386 is connected to an input 390 of a DELAY network 391. An output 392 of DELAY network 391 is connected to an input 393 of an AND gate 394. AND gate 394 further has an input 395 and an output 396. Input 395 of AND gate 394 is connected by means of a conductor 397 and a conductor 398 to the input 385 of INPUT ACKNOWLEDGE generator 386. The output 396 of AND gate 394 is connected to a SET input 399 of a flip-flop 400. Flip-flop 400 has a RESET input 401 and a "1" output 402.

Input 385 of input acknowledge generator 386 is connected by means of conductor 398 to an input 403 of an invertor 404. The output 405 of invertor 404 is connected to an input 406 of a DELAY network 407. An output 408 of DELAY network 407 is connected to an input 409 of an AND gate 410. AND gate 410 further has an input 411 and an output 412. Input 411 of AND gate 410 is connected to the output 405 of invertor 404, while output 412 of AND gate 410 is connected to the RESET input 401 of flip-flop 400. Output 402 of flip-flop 400 is connected to the output 387 of INPUT ACKNOWLEDGE generator 386.

OPERATION

In operation, a digital input word is applied to the inputs 20–27, and an INPUT REQUEST signal is applied to input 29. If the input word is to be used as a command input a signal will also appear at TAG input 28. These signals are coupled to the inputs of COMMAND INPUT AND gate 30 and since both INPUT REQUEST and TAG input signals are present the gate 30 will be enabled and the digital word will pass through gate 30 to outputs 31 and will be fed to the COMMAND DECODER 32. The first command to the decoder will be indicative of either a NORMAL or COMPLEMENT mode of operation of the image display and a suitable output will appear at either outputs 35 or 36 of the COMMAND DECODER. Assuming that the command signal is indicative of normal operation an output signal will appear at output 35 of the COMMAND DECODER and will be coupled to the SET input 200 of the NORMAL/COMPLEMENT flip-flop 201 and will set flip-flop 201 to its "1" state. This will produce an output signal at output 203 of NORMAL/COMPLEMENT flip-flop 201 which will be coupled through conductor 205 to the input 190 of AND gate 189 and to the input 206 of AND gate 207.

The INPUT REQUEST signal is also coupled to input 385 of INPUT ACKNOWLEDGE generator 386 and after a predetermined time a signal will appear at output 387 of generator 386 which will be coupled to an input acknowledge output 388. The signal will be transferred back to the sending source to indicate that the input signal has been received. After the command signal has been received and the image display set to its NORMAL mode of operation, a second digital word input is applied to inputs 20–27, and a second INPUT REQUEST signal is applied to line 29. Assuming the second word is also a command input, a signal will appear at TAG input 28 and the digital word will again be coupled through COMMAND INPUT AND gate 30 to the COMMAND DECODER 32. Assuming the second command word is indicative of a START INPUT, the word will be decoded in COMMAND DECODER 32 and an output will appear at output 33 of decoder 32 which will be coupled to input 40 of AND gate 41. The INPUT REQUEST signal at input 29 is also coupled to input 42 of AND gate 41 enabling AND gate 41 and an output appears at output 43 of AND gate 41 which is fed into the SET input 44 of START/END INPUT flip-flop 45 setting flip-flop 45 to its "1" state. When flip-flop 45 is in its "1" state an output appears at output 47 which is coupled through conductor 50 to the input 51 of START INPUT AND gate 52.

When the image display has received commands to operate in its NORMAL mode, and has been initiated for start of input, the remaining digital inputs will be indicative of data intensity signals and these signals appear in the form of a six-bit input word appearing on inputs 20–25. When the digital input represents data intensity signals no TAG input is applied to 28, and the absence of a signal on line 28 will be fed through conductor 330 and inverted in invertor 331 to provide an enabling TAG input to signal input 327 of INTENSITY INPUT AND gate 326. Since no TAG input is applied to COMMAND INPUT AND gate 30, this gate will be inhibited and the input word will not be fed through to the COMMAND DECODER. At the same time that the data intensity word appears at the input of AND gate 326 an INPUT REQUEST signal appears at input 29 and is coupled through conductor 55 to the input 53 of START INPUT AND gate 52. Both inputs of AND gate 52 are now enabled and an output signal appears at output 54 of AND gate 52 which is fed to the input 328 of INTENSITY INPUT AND gate 326 thereby enabling this gate and allowing the intensity data word to be fed through AND gate 326 to the output lines 332 which in turn couple the signal to the inputs 340–345 of the INTENSITY register 346 for storage in the INTENSITY register.

The output from AND gate 52 is also coupled to the SET input 56 of START CLOCK flip-flop 57 causing flip-flop 57 to be set to its "1" state. When flip-flop 57 is in its "1" state an output appears at output 59 which is coupled through conductor 60 to the input 63 of the CLOCK AND gate 64 thereby enabling gate 64.

At the initiation of input information to the image display all of the registers are in a binary zero state and therefore the outputs 75, 76 and 77 of MINOR VERTICAL DEFLECTION register 73 and the outputs 122, 123 and 124 of MINOR HORIZONTAL DEFLECTION register 121 indicate binary zeroes. These signals are coupled through conductors 137-142, conductors 151-156 and invertors 157–162 to the inputs 163–168 of AND gate 169. The binary "0" outputs from the MINOR VERTICAL and HORIZONTAL DEFLECTION registers are inverted in invertors 157–162 and appear as binary ones at the inputs of AND gate 169, which in turn enable AND gate 169 to produce an output signal at output 171 of AND gate 169 which is coupled through conductor 186 to the input 187 of AND gate 189. The signal at inputs 187 and 190 enable AND gate 189.

Since CLOCK AND gate 64 has been enabled by the output from flip-flop 57, the next clock pulse appearing at output 70 of CLOCK PULSE generator 71 will be coupled through conductor 67, AND gate 64, and conductor 194 to the input 191 of AND gate 189. As explained, AND gate 189 is enabled and therefore the clock pulse will be coupled through AND gate 189, conductor 377, and conductor 372 to the SET input 373 of CATHODE RAY TUBE BEAM flip-flop 374 thereby setting flip-flop 374 to its "1" state. When flip-flop 374 is in its "1" state a signal appears at output 376 which in turn is coupled to the control grid 108 of cathode ray tube 95 turning on the electron beam of cathode ray tube 95.

The clock pulse appearing at the output 66 of CLOCK AND gate 64 will also be coupled to the input 72 of the MINOR VERTICAL DEFLECTION register 73 and will be counted therein. This single count in the MINOR VERTICAL DEFLECTION register will appear on the register read output 75–77 and will be coupled to the inputs 83–85 of the MINOR VERTICAL DIGITAL TO ANALOG convertor 86 where it will be converted to an analog voltage which will be coupled from the outputs 87 and 88 of DIGITAL TO ANALOG convertor 86 through amplifier 91 to the vertical deflection inputs 92 and 93 of the MINOR DEFLECTION coil 94 of cathode ray tube 95. This analog signal at the MINOR DEFLECTION coil will cause the electron beam to begin a minor vertical trace in the upper left-hand corner of the screen or target 110 of cathode ray tube 95.

Subsequent clock pulses from CLOCK PULSE generator 71 will also be fed to the input 72 of the MINOR VERTICAL DEFLECTION register 73 and will be counted in register 73. As the count in the MINOR VERTICAL DEFLECTION register increases, the minor vertical sweep on the target 110 of cathode ray tube 95 will increase in length in the vertical direction. As shown, MINOR VERTICAL DEFLECTION register 73 is a three-bit digital register and therefore has a capacity to count 8 pulses before recycling to zero. When the MINOR VERTICAL DEFLECTION register is at its maximum count, the minor vertical sweep on target 110 of cathode ray tube 95 will be at its maximum length. The next clock pulse from CLOCK PULSE generator 71 will cause the MINOR VERTICAL DEFLECTION register 73 to reset to zero and to start recounting to thereby trace another minor vertical sweep. At the same time that MINOR VERTICAL DEFLECTION register 73 recycles to zero an output pulse appears at output 74 of register 73 which is coupled to input 120 of the MINOR HORIZONTAL DEFLECTION register 121 and is counted therein. This count in the MINOR HORIZONTAL DEFLECTION REGISTER will appear at the register read output 122–124 of MINOR HORIZONTAL DEFLECTION register 121 and will be coupled to the inputs 130–132 of the MINOR HORIZONTAL DIGITAL TO ANALOG convertor 133 where it will be converted to an analog signal which will appear at the outputs 134 and 135 of DIGITAL TO ANALOG convertor 133 and will be coupled through amplifier 136 and applied to the horizontal deflection inputs 96 and 97 of the MINOR DEFLECTION coil 94. The analog signal appearing at the horizontal deflection inputs of MINOR DEFLECTION coil 94 will cause the second minor vertical sweep to be spaced one minor space to the right on the target face.

As can been seen from the above description, each cyclic count in the MINOR VERTICAL DEFLECTION register 73 produces a minor vertical sweep, and each count in the MINOR HORIZONTAL DEFLECTION register 121 causes the successive minor vertical sweep to be spaced horizontally one minor space. As shown, the MINOR HORIZONTAL DEFLECTION register is also a three-bit digital counter and is therefore capable of counting eight pulses before recycling. When the MINOR HORIZONTAL DEFLECTION register 121 is full, in other words, when it has counted eight pulses, there will have been formed eight spaced minor vertical sweeps on the target 110 of cathode ray tube 95. These eight minor vertical sweeps constitute a minor raster. In other words, a minor raster is generated each time the MINOR HORIZONTAL DEFLECTION register 121 counts through a complete cycle.

As explained previously, the data intensity signal is stored in the INTENSITY register 346, and this six-bit digital word appears at the outputs 347–352 of INTENSITY register 346 and is fed to inputs 353–358 of a six-bit COMPARATOR 359. The counts stored in the MINOR VERTICAL and MINOR HORIZONTAL DEFLECTION registers 73 and 121 appears at outputs 78–80 of register 73 and 125 through 127 of register 121 and are fed to inputs 360–365 of the COMPARATOR 359. When the count in the MINOR VERTICAL and HORIZONTAL DEFLECTION registers equals the data intensity signal in INTENSITY register 346, there will be coincidence between the two signals and COMPARATOR 359 will produce an output signal at its output 366 which will be coupled through conductor 370 and conductor 371 to the input 208 of AND gate 207. Since, as explained previously, the display indicator is operating in its NORMAL mode, the signal from output 203 of flip-flop 201 has enabled input 206 of AND gate 207 so that upon the occurrence of the output signal from COMPARATOR 359, AND gate 207 will be enabled and an output signal will appear at output 209 which will be coupled through conductor 379 to the RESET input 375 of CATHODE RAY TUBE BEAM flip-flop 374 causing flip-flop 374 to return to its "0" state. When flip-flop 374 returns to its zero state the signal disappears from output 376 of flip-flop 374 and from the control grid 108 of cathode ray tube 95 and the electron beam of cathode ray tube 95 turns off.

Thus, in the NORMAL mode of operation, the cathode ray tube beam is turned on at the same time that the MINOR VERTICAL and HORIZONTAL DEFLECTION registers began counting, and turns off whenever the count in the MINOR VERTICAL and HORIZONTAL DEFLECTION registers is coincident with the data intensity signal in INTENSITY register 346. After coincidence between the intensity signal and the count in the MINOR VERTICAL and HORIZONTAL DEFLECTION registers has turned off the electron beam of cathode ray tube beam 95, the remainder of the minor raster will be generated without the cathode ray tube electron beam on and hence the remaining portion of the target screen 110 for that minor raster will remain translucent and not opaque. The portion of the target screen 110 covered by the minor raster when the electron beam is on will be opaque.

Figure 5:
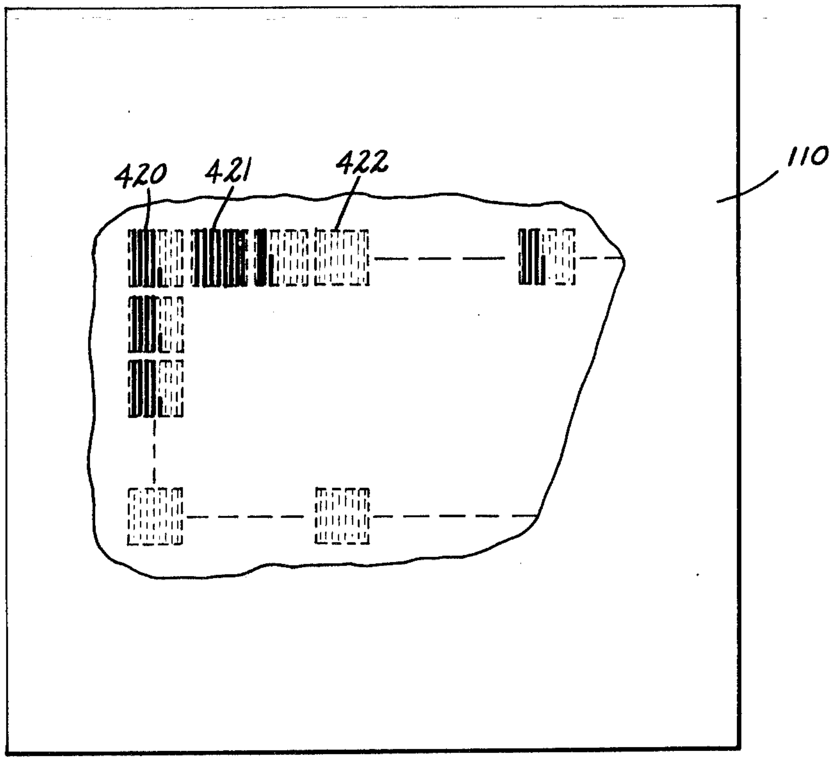
FIG. 5 is a representation of the face of a dark trace storage cathode ray tube utilized in the present invention, and is shown in greatly enlarged illustrative form.
Figure 8:
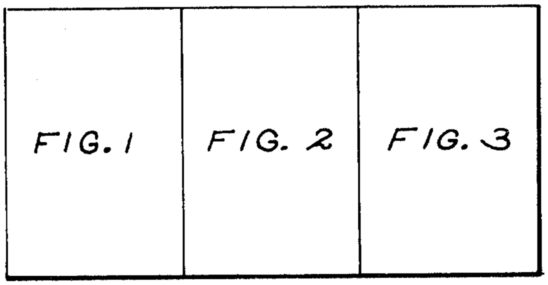
FIG. 8 is a plan view of the positioning of FIGS. 1, 2 and 3.

Referring to FIG. 5 there is shown a representation of the screen, or target, 110 of cathode ray tube 95 in greatly enlarged form. As can be seen from FIG. 5, a minor raster 420 has a portion of its vertical sweeps shown in dark or opaque lines, while the remainder of minor raster 420 is shown in dotted lines to indicate the translucent nature of that portion of the minor raster 420. Similarly, minor raster 421 is shown completely opaque, indicating that the electron beam of cathode ray tube 95 is on during all of the vertical sweeps of minor raster 421. Similarly, a minor raster 422 is indicated completely in dotted lines indicating that this minor raster is completely translucent, or in other words, that the electron beam of cathode ray tube 95 was off during the generation of minor raster 422.

When a minor raster has been generated, that is, when both the MINOR VERTICAL DEFLECTION register 73 and the MINOR HORIZONTAL DEFLECTION register 121 are full, binary "1" signals will appear at register read outputs 75–77 of register 73 and register read outputs 122–124 of register 121. These signals will be coupled through conductors 137–142 to the inputs 143–148 of AND gate 150 thereby enabling AND gate 150 and producing an output signal at its output 170. The output from AND gate 150 will be coupled through conductor 172 and conductor 173 to the RESET input 58 of START CLOCK flip-flop 57 thereby resetting flip-flop 57 to its "0" state. When flip-flop 57 is in its "0" state the output signal disappears from output 59 of flip-flop 57 which in turn inhibits CLOCK AND gate 64. When CLOCK AND gate 64 is inhibited the clock pulses from CLOCK PULSE generator 71 are no longer fed to the MINOR VERTICAL and HORIZONTAL DEFLECTION registers and the generation of an image on the screen 110 of cathode ray tube 95 stops.

At this time a second digital intensity signal is applied to the inputs 20–25, and an INPUT REQUEST signal appears on line 29. As explained previously, the INPUT REQUEST signal will be fed to the input 53 of START INPUT AND gate 52 and, since input 51 of gate 52 is enabled from the "1" output from START/END INPUT flip-flop 45, a pulse will appear at output 54 of gate 52 which will again enable INTENSITY INPUT AND gate 326 thereby feeding the new data intensity signal to the INTENSITY register 346 for storage therein. At the same time the output from gate 52 will fed to the SET input 56 of flip-flop 57 again putting flip-flop 57 in its "1" state and applying an enabling signal to the input 63 of CLOCK AND gate 64.

As previously described, the MINOR VERTICAL and HORIZONTAL DEFLECTION registers are full, so that the next clock pulse from CLOCK PULSE generator 71 through gate 64 to the input 72 of MINOR VERTICAL DEFLECTION register 73 causes the MINOR VERTICAL DEFLECTION register to recycle to zero, and at the same time an output is produced at output 74 of register 73 which is fed to the input 120 of MINOR HORIZONTAL DEFLECTION register 121 causing register 121 to recycle to zero.

The output from AND gate 150, caused by the MINOR VERTICAL and MINOR HORIZONTAL DEFLECTION registers being in their full state, is also coupled through conductor 172 to the input 182 of AND gate 183. Therefore, the clock pulse from the output of gate 64 which causes the MINOR VERTICAL and HORIZONTAL DEFLECTION registers to recycle to zero is also coupled through conductor 193 and AND gate 183 to the input 218 of the MAJOR HORIZONTAL DEFLECTION register 219 thereby causing register 219 to increment by one count. This single count in the MAJOR HORIZONTAL DEFLECTION register will appear on the register read outputs 220–229 and will be coupled to the inputs 230–239 of the MAJOR HORIZONTAL DIGITAL TO ANALOG convertor 240 where it will be converted to an analog voltage which will be coupled from the outputs 241 and 242 of DIGITAL TO ANALOG convertor 240 through amplifier 243 to the horizontal deflection inputs 99 and 100 of the MAJOR DEFLECTION coil 98 of cathode ray tube 95. This analog signal at the MAJOR DEFLECTION coil will cause the electron beam to be spaced one major space horizontally on the face of the target 110 of cathode ray tube 95.

Subsequent clock pulses from CLOCK PULSE generator 71 will again be coupled to the MINOR VERTICAL and HORIZONTAL DEFLECTION registers and will generate another minor raster in exactly the same way as previously described, with the exception that the second minor raster will be spaced horizontally on the cathode ray tube target 110 by one major space due to the count in the MAJOR HORIZONTAL DEFLECTION register 219.

At the completion of the generation of each minor raster, a new digital intensity signal is fed to the INTENSITY register 346, and the MAJOR HORIZONTAL DEFLECTION register will increment by another count thereby causing each subsequent minor raster to be spaced horizontally to the right of the target face one major horizontal space. This procedure continues until the MAJOR HORIZONTAL DEFLECTION register 219 is full at which time a plurality of minor rasters will have been spaced horizontally along the top of the screen or target 110 of the cathode ray tube 95.

When MAJOR HORIZONTAL DEFLECTION register 219 is full, binary "1" signals will appear at each of its register read outputs 220–229 which will be coupled to the inputs 241–250 of AND gate 251 thereby producing an output signal at output 252 of AND gate 251 which will be coupled through conductor 253 to the input 254 of AND gate 255 thereby enabling AND gate 255.

When AND gate 255 is enabled, the next clock pulse coming from AND gate 64 will be coupled through conductor 193 and AND gate 183, to the input 218 of MAJOR HORIZONTAL DEFLECTION register 219 causing register 219 to recycle to zero count, and this clock pulse will also be coupled through conductor 193, AND gate 183, conductor 260, and AND gate 255, to the input 261 of the MAJOR VERTICAL DEFLECTION register 262 thereby causing register 262 to increment by one count. This single count in the MAJOR VERTICAL DEFLECTION register will appear at the register read outputs 263–272 and will be coupled to the inputs 273-282 of the MAJOR VERTICAL DIGITAL TO ANALOG convertor 283 where it will be converted to an analog voltage which will appear at the outputs 284 and 285 of DIGITAL TO ANALOG convertor 283 and will be coupled through amplifier 286 to the vertical deflection inputs 101 and 102 of the MAJOR DEFLECTION coil 98 of cathode ray tube 95. This analog signal at the MAJOR DEFLECTION coil will cause the electron beam to move vertically downwardly on the target or screen 110 of cathode ray tube 95 by one major deflection.

The above-described operation then continues, or the cycle repeats, with a second horizontal line of minor rasters being formed horizontally across the screen 110 of the cathode ray tube 95. This procedure continues until the MAJOR HORIZONTAL DEFLECTION register 219, and the MAJOR VERTICAL DEFLECTION register 262, as well as the MINOR VERTICAL and MINOR HORIZONTAL DEFLECTION registers 73 and 121 respectively are full, at which time the last minor raster will have been produced at the lower right-hand corner of the target or screen 110 of cathode ray tube 95, and the entire major raster will have been produced from a plurality of closely-spaced minor rasters. When the MINOR VERTICAL DEFLECTION register 73 and THE MINOR HORIZONTAL DEFLECTION register 121 are both full, binary "1" signals will be applied to the inputs 143–148 of AND gate 150 and an output pulse will be produced at the output 170 of AND gate 150 which will be coupled through conductor 172 and conductor 309 to the input 306 of AND gate 304. Likewise, when the MAJOR HORIZONTAL DEFLECTION register 219 is full, binary "1" signals will be coupled from each of its register read outputs 220–229 to the inputs 241–250 of AND gate 251, and an output signal will be produced at output 252 of AND gate 251 which will be coupled through conductor 308 to the input 305 of AND gate 304. Similarly, when the MINOR VERTICAL DEFLECTION register 262 is full, binary "1" signals will be produced in each of its register read outputs 263–272 which will be coupled through the inputs 290–299 of AND gate 300 and an output signal will be produced at output 301 of AND gate 300 which will be coupled through 302 to the input 303 of AND gate 304. Since input signals are applied to all three of the inputs of AND gate 304 an output will be produced at output 307 of AND gate 304 which will be coupled to the SET input 310 of MAJOR RASTER END FLIP-FLOP 311 setting flip-flop 311 to its "1" state. This will produce an output signal at output 313 of flip-flop 311 indicative of the end of the generation of the major raster. This output signal signifying the end of the major raster can be coupled back to original transmitting equipment, which may be either a digitizer or a digital computer, to indicate to the transmitting equipment that the entire major raster has been completed, and that the image has been formed on the target 110 of cathode ray tube 95. Upon receiving an indication of end of the major raster, a transmitting device can transmit a digital signal to the inputs 20–27, and also a TAG input to input 28 and an INPUT REQUEST to input 29, which signals will be coupled to the inputs of COMMAND INPUT AND gate 30. Since both a TAG input signal is present at input 28 and an INPUT REQUEST signal at input 29, AND gate 30 will be enabled and the digital signal of inputs 20–27 will appear at output 31 of AND gate 30 and will be coupled to the COMMAND DECODER 32. The signal will be indicative of END INPUT, and will be decoded in COMMAND DECODER 32 and an output will appear at COMMAND DECODER output 34. This signal will be coupled to the RESET input 46 of START/END INPUT flip-flop 45 causing flip-flop 45 to return to its "0" state. When flip-flop 45 is in its "0" state the output from output 47 of flip-flop 45 disappears and the START INPUT AND gate 52 will be inhibited. At this time any suitable master clear or reset signal (not shown) can be fed to the various registers to reset all registers back to zero. Resetting of the registers to zero will have no effect on the image already produced on the target 110 of cathode ray tube 95, and this invention will remain on the target 110 until such time that an erase signal is presented to the cathode ray tube 95. As shown, the erase signal will be applied to the heating coils 111, and can be any suitable signal which will cause the heating coils 111 to heat; the generated heat causes the image on target 110 to fade, and causes target 110 to return to its normal translucent state.

As explained in the operation of the image display of the present invention, when the image display is operating in its NORMAL mode, the electron beam of the cathode ray tube 95 is turned on at the beginning of the generation of a minor raster, which is the same time that the digital intensity signal is fed to the INTENSITY register 346, and the electron beam of cathode ray tube 95 is turned off when the count in THE MINOR VERTICAL and HORIZONTAL DEFLECTION registers 73 and 121 respectively, is coincident with the digital data intensity signal stored in INTENSITY register 346.

When the image display system of the present invention operates in its COMPLEMENT mode, the electron beam of cathode ray tube 95 is turned on when the count in the MINOR VERTICAL and HORIZONTAL DEFLECTION registers 73 and 121 respectively is coincident with a digital data intensity signal stored in INTENSITY register 346, and the electron beam of cathode ray tube 95 is turned off at the end of the generation of the minor raster. This is accomplished as follows: If it is desired that the image display system should operate at its COMPLEMENT mode, a command signal will be fed to COMMAND DECODER 32 which will produce an output signal at the COMPLEMENT output 36 of COMMAND DECODER 32. The signal will be coupled to the RESET input 202 of the NORMAL/COMPLEMENT flip-flop 201 thereby setting flip-flop 201 to its "0" state. When flip-flop 201 is in its "0" state an output signal will appear at output 204 of flip-flop 201 which will be coupled through conductor 210 to the input 211 of AND gate 212. As explained previously, a START INPUT signal will now be presented to COMMAND DECODER 32 and suitable signals will be generated in the manner previously described to prepare the image display system for receiving input data signals indicative of an image to be generated. When a data intensity signal is received it will be coupled through INTENSITY INPUT AND gate 326 to INTENSITY register 346 for storage therein. When the clock pulse appears at the output 66 of AND gate 64, this pulse will be coupled through conductor 194 to the input 191 of AND gate 189, however, since the image display system is operating in its COMPLEMENT mode there will be no input signal at the input 190 of AND gate 189 and AND gate 189 will be inhibited. Therefore, there will be no signal to the SET input 373 of CATHODE RAY TUBE BEAM flip-flop 374 and hence no signal to turn on the electron beam of cathode ray tube 95.

When the count in the MINOR VERTICAL and HORIZONTAL DEFLECTION registers 73 and 121 respectively, is coincident with the data intensity signal stored in register 346, COMPARATOR 359 will produce an output signal at its output 366 which will be fed to the input 213 of AND gate 212. Since the COMPLEMENT signal from the "0" output 204 of flip-flop 201 is present in the input 211 of AND gate 212 an output will be produced at output 214 of AND gate 212 which will be coupled through conductor 372 to the SET input 373 of CATHODE RAY TUBE BEAM flip-flop 374 causing flip-flop 374 to switch to its "1" state. This will produce an output signal at output 376 of flip-flop 374 which will be coupled to the control grid 108 of cathode ray tube 95 thereby turning on the electron beam of cathode ray tube 95. The electron beam of cathode ray tube 95 will remain in an on condition until such time that the MINOR VERTICAL and HORIZONTAL DEFLECTION registers 73 and 121 respectively are full, at which time an output signal will be produced from AND gate 150 which will be coupled through conductor 172 and conductor 174 to the input 175 of AND gate 176. Since the "0" COMPLEMENT signal from output 204 of flip-flop 201 is applied to input 177 of AND gate 176 an output will appear at output 180 of AND gate 176 which will be coupled through conductor 380 and conductor 379 to the RESET input 375 of CATHODE RAY TUBE BEAM flip-flop 374 causing flip-flop 374 to return to its "0" state, which in turn will turn off the electron beam of cathode ray tube 95.

Referring to FIG. 4, the INPUT ACKNOWLEDGE generator 386 operates as follows:

Upon occurrence of an INPUT REQUEST signal at input 29, this signal will be conducted through conductor 384 to the input 385 of the INPUT ACKNOWLEDGE generator 386. From input 385 the INPUT REQUEST signal is simultaneously applied to input 390 of DELAY circuit 391 and also through conductor 397 to the input 395 of AND gate 394. After a suitable delay, for example 500 nano-seconds, the signal applied to input 390 of DELAY circuit 391 appears at the output 392 and is fed to input 393 of AND gate 394. At this time both inputs 393 and 395 of AND gate 394 are enabled and an output appears at output 396 of AND gate 394 which is coupled to the SET input 399 of flip-flop 400, causing flip-flop 400 to switch to its "1" state. When flip-flop 400 is in its "1" state an output appears at output 402 of flip-flop 400 which is coupled to the output 387 of INPUT ACKNOWLEDGE generator 386.

When no INPUT REQUEST signal appears at input 29, the lack of signal is inverted in invertor 404 and appears as an INPUT REQUEST signal 405 at the output of invertor 404. This signal is coupled simultaneously to the input 406 of DELAY network 407, and also to the input 411 of AND gate 410. After a suitable delay, for example, 500 nano-seconds, the signal applied to input 406 of DELAY network 407 will appear at output 408 and will be coupled to the input 409 of AND gate 410. Since both inputs 409 and 411 of AND gate 410 are now enabled, an output will appear at output 412 of AND gate 410 which will be coupled to the RESET input 401 of flip-flop 400 causing flip-flop 400 to return to its "0" state. At this time the input acknowledge signal will disappear from output 402 of flip-flop 400, and similarly, no signal will be applied at the output 387 of the INPUT ACKNOWLEDGE generator 386.

As described in this application, the image display of the present invention utilizes a plurality of minor rasters, each minor raster formed from minor vertical sweeps, each successive minor vertical sweep being spaced horizontally one minor horizontal spacing. The size of the minor rasters are in the neighborhood of ten mils square. It should be understood that the minor rasters could as readily be produced from minor horizontal sweeps, each successive minor horizontal sweep being spaced vertically a minor vertical spacing, or from minor spiral sweeps. Similarly, though it has been described in this application that the minor rasters are applied to the target of the cathode ray tube beginning in the upper left-hand corner and moving horizontally, this is for the purpose of description only, and the minor rasters can be applied in any sequence desired.

As explained, the formation of an image in accordance with the present invention utilizes a large number, in the neighborhood of one million, minor rasters, each minor raster having its own intensity level. It should be understood that the intensity level of any one particular minor raster is not particularly significant in the formation of the overall image, but rather it is the formation of the image from a large plurality of these individual minor rasters which provides the increased resolution of displayed image which is possible with the present invention.

Figure 6:
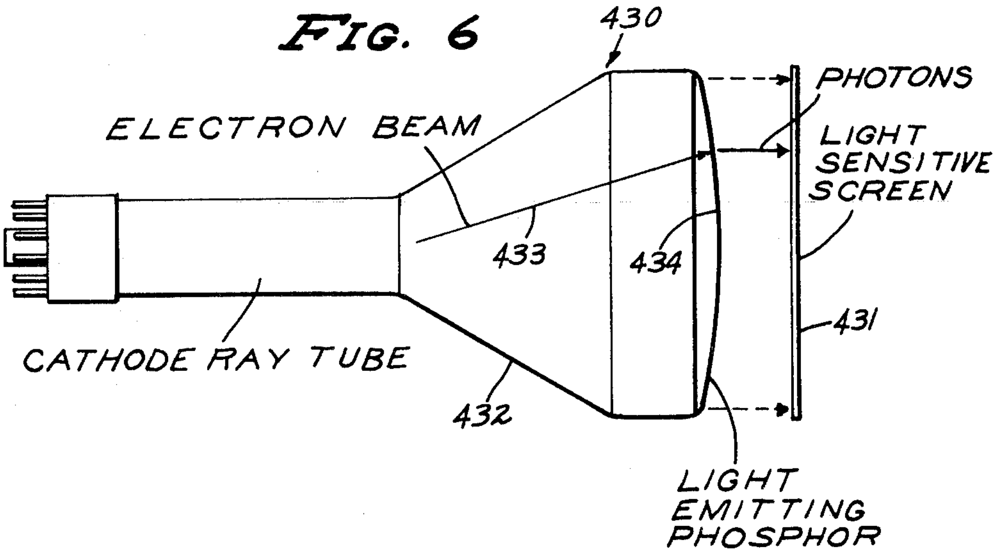
FIGS. 6 and 7 are diagramatic representations of modified embodiments of the present invention.

While the preferred embodiment of the present invention has been set forth utilizing a dark trace storage tube as the cathode ray tube, it should be understood that the present invention is not limited to the use of a cathode ray tube, and other means of forming the minor rasters on a target or screen can be utilized. For example, referring to FIG. 6, there is shown a portion of a display system wherein the target or light sensitive screen, indicated at 431, is located outside of a cathode ray tube 432. The electron beam of the cathode ray tube, indicated at 433, impinges on a light emitting phosphorus screen 434 which merely is used as a light source, emitting photons which produce an image on the light sensitive screen 431. The overall image formed on screen 431 can be formed in the same manner as previously described, namely, a major raster can be produced from a plurality of individually-spaced minor rasters.

Figure 7:
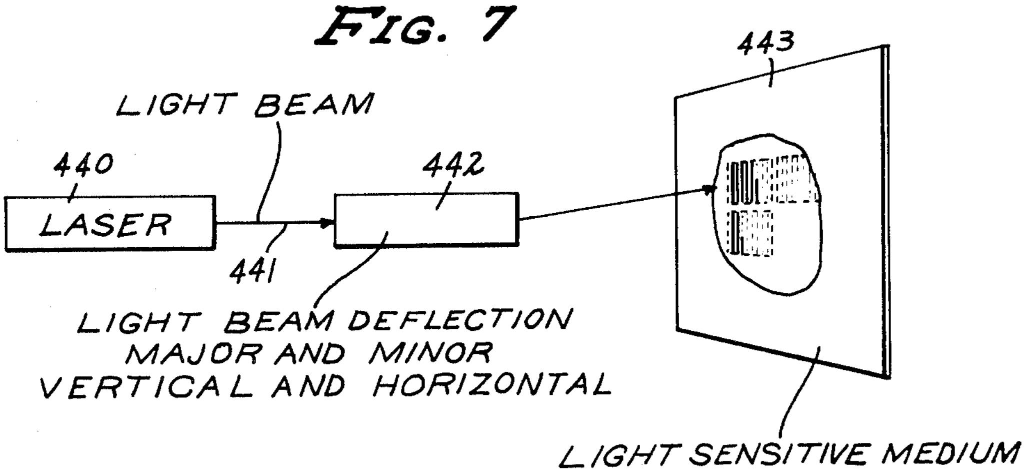

Similarly, as shown in FIG. 7, there is shown an illustrative drawing of a laser system wherein a laser source 440 produces a light beam indicated at 441. The light beam is deflected by means of a deflection circuit 442 and impinges against a target or light sensitive screen or medium indicated at 443. By controlling the deflection of the light beam 441 by means of deflection circuit 442 an overall image can be produced on the light sensitive target 443 in the same manner as previously described, that is, the overall display or major raster is formed from a plurality of individually-spaced minor rasters, each minor raster having its own intensity level.

While I have shown a specific embodiment of my invention, it is to be understood that this is for the purpose of illustration only, and that my invention is to be limited solely by the scope of the attended claims.

What is claimed is:

1. An image display comprising:

a. a cathode ray tube;

b. control means connected to said cathode ray tube for controlling the electron beam deflection of said tube to produce a major raster from a plurality of individually spaced minor rasters; and c. intensity control means connected to said cathode ray tube for varying the intensity of said electron beam between a first high level intensity for a predetermined length of time of each minor raster and a second low level intensity during the remaining time of each minor raster in response to a minor raster intensity input signal.

2. An image display as set forth in claim 1 wherein said cathode ray tube is a dark trace storage tube.

3. An image display as set forth in claim 1 wherein means are connected to said intensity control means to operate said intensity control means between a first mode of operation wherein the intensity of each minor raster is a direct representation of its intensity input signal, and a second mode of operation wherein the intensity of each minor raster is a complement representation of its intensity input signal.

4. An image display as set forth in claim 1 wherein said cathode ray tube is a dark trace storage tube.

5. An image display comprising:

a. a cathode ray tube having a major deflection coil and a minor deflection coil associated therewith, each of said coils having a horizontal deflection input and a vertical deflection input;

b. a minor vertical deflection register and a minor horizontal deflection register, each having a pulse input and a register read output;

c. a clock pulse generator having an output;

d. means connecting the output of said clock pulse generator to the pulse input of said minor vertical deflection register;

e. means connected to apply a pulse to the input of said minor horizontal deflection register each time said minor vertical deflection register reaches a predetermined count;

f. a minor vertical digital to analog convertor;

g. means connecting said minor vertical digital to analog convertor between the register read output of said minor vertical deflection register and the vertical deflection input of said minor deflection coil, said minor vertical digital to analog convertor producing an analog signal output proportional to the digital count in said minor vertical deflection register;

h. a minor horizontal digital to analog convertor;

i. means connecting said minor horizontal digital to analog convertor between the register read output of said minor horizontal deflection register and the horizontal deflection input of said minor deflection coil, said minor horizontal digital to analog convertor producing an analog signal output proportional to the digital count in said minor horizontal deflection register;

j. a major vertical deflection register and a major horizontal deflection register, each having a pulse input, and a register read output;

k. means connected to apply a pulse to the input of said major horizontal deflection register each time said minor horizontal deflection register reaches a predetermined count;

l. means connected to apply a pulse to the input of said major vertical deflection register each time said major horizontal deflection register reaches a predetermined count;

m. a major horizontal digital to analog convertor;

n. means connecting said major horizontal digital to analog convertor between the register read output of said major horizontal deflection register and the horizontal deflection input of said major deflection coil, said major horizontal digital to analog convertor producing an analog signal output proportional to the digital count in said major horizontal deflection register;

o. a major vertical digital to analog convertor; and p. means connecting said major vertical digital to analog convertor between the register read output of said major vertical deflection register and the vertical deflection input of said major deflection coil, said major vertical digital to analog convertor producing an analog signal output proportional to the digital count in said major vertical deflection register.

6. An image display as set forth in claim 5 wherein intensity control means are connected to said cathode ray tube for varying the intensity of the electron beam of said cathode ray tube between a first high level intensity and a second low level intensity during the time said minor vertical and minor horizontal deflection registers count through a complete cycle, said intensity varying between said high level and said low level in response to an intensity input signal.

7. An image display comprising:

a. a cathode ray tube having a control grid for controlling the intensity of the tube electron beam;

b. a digital comparator circuit;

c. means connected to said comparator circuit for feeding a digital intensity input signal thereto;

d. a counting register having an input and a register read output;

e. a clock pulse generating circuit having an output;

f. means connecting the output of said clock pulse generator to the input of said counting register;

g. means connecting the read output of said register to said comparator, said comparator producing an output signal upon coincidence between an input signal and a register read signal;

h. means connected to apply a first level intensity signal to the control grid of said cathode ray tube upon the occurrence of an intensity input signal to said comparator;

i. means connected to said counting register to begin the count of said clock pulses in said register upon the occurrence of an intensity input signal to said comparator; and j. means connected to apply a second level intensity signal to the control grid of said cathode ray tube in response to an output signal from said comparator.

8. An image display comprising:

a. a cathode ray tube;

b. means connected to said cathode ray tube to apply minor vertical and minor horizontal deflection signals thereto to deflect the cathode ray tube electron beam to produce minor rasters;

c. means connected to said cathode ray tube to apply major horizontal and major vertical deflection signals thereto to deflect the cathode ray tube electron beam to closely space a plurality of said minor rasters over the face of said cathode ray tube to produce a major raster;

d. intensity control means adapted to receive a train of intensity input signals, each intensity input signal in said train representing an intensity level for an individual minor raster of said major raster; and e. means connecting said intensity control means to said cathode ray tube to vary the intensity of the electron beam of said cathode ray tube between a first intensity level and a second intensity level during each minor raster in response to the intensity input signal for each minor raster.

9. An image display comprising:

a. a cathode ray tube having a control grid for controlling the intensity of the tube electron beam, said cathode ray tube having a minor deflection coil and a major deflection coil associated therewith, each of said deflection coils having a horizontal deflection input and a vertical deflection input;

b. a minor vertical deflection register;

c. means connected to said minor vertical deflection register to supply clock pulses thereto to be counted by said register;

d. means connected between said minor vertical deflection register and the vertical deflection input of said minor deflection coil to apply an analog signal to said vertical deflection input proportional to the count in said minor vertical deflection register;

e. a minor horizontal deflection register;

f. means connected to supply a pulse to said minor horizontal deflection register to be counted by said register each time said minor vertical deflection register counts through a complete cycle;

g. means connecting said minor horizontal deflection register to the horizontal deflection input of said minor deflection coil to provide an analog signal to said horizontal deflection input proportional to the count in said minor horizontal deflection register;

h. a major horizontal deflection register;

i. means connected to supply a pulse to said major horizontal deflection register to be counted by said register each time said minor vertical and minor horizontal deflection registers count through a complete cycle;

j. means connecting said major horizontal deflection register to the horizontal deflection input of said major deflection coil to provide an analog signal to said horizontal deflection input proportional to the count in said major horizontal deflection register;

k. a major vertical deflection register;

l. means connected to said major horizontal deflection register to apply a pulse to be counted by said major vertical deflection register each time said major horizontal deflection register counts through a complete cycle; and m. means connecting said major vertical deflection register to the vertical deflection input of said major deflection coil to provide an analog signal to said vertical deflection input proportional to the count in said major vertical deflection register.

10. An image display as set forth in claim 9 wherein sensing means are connected to said minor vertical, said minor horizontal, said major horizontal, and said major vertical deflection registers to produce a signal indicative of the end of the raster of said cathode ray tube display each time all of said registers reach a predetermined count.

11. An image display comprising:

a. a cathode ray tube having a control grid for controlling the intensity of the tube electron beam, said cathode ray tube having a minor deflection coil and a major deflection coil associated therewith, each of said deflection coils having a horizontal deflection input and a vertical deflection input;

b. register means for counting input pulses applied thereto, said register having a plurality of outputs, each output representing a different bit of the digital number count in said register;

c. means connected between said register means and said minor deflection coil to provide an analog signal proportional to a plurality of the least significant bits of the digital number count in said register means to said vertical deflection input of the minor deflection coil, and to provide an analog signal proportional to a plurality of the second least significant bits of the digital number count in said register means to said horizontal deflection input of the minor deflection coil; and d. means connected between said register means and said major deflection coil to provide an analog signal proportional to a plurality of the third least significant bits of the digital number count in said register means to said horizontal deflection input of the major deflection coil, and to provide an analog signal proportional to a plurality of the fourth least significant bits of the digital number count in said register means to said vertical deflection input of the major deflection coil.

12. An image display comprising:

a. a cathode ray tube having a major deflection coil and a minor deflection coil associated therewith, each of said coils having a first deflection input and a second deflection input, each of said second deflection inputs producing a deflection of the cathode ray tube electron beam in a direction different from said first deflection inputs;

b. a first minor deflection register and a second minor deflection register, each having a pulse input and a register read output;

c. a clock pulse generator having an output;

d. means connecting the output of said clock pulse generator to the pulse input of said first minor deflection register;

e. means connected to apply a pulse to the input of said second minor deflection register each time said first minor deflection register reaches a predetermined count;

f. a first minor digital to analog convertor;

g. means connecting said first minor digital to analog convertor between the register read output of said first minor deflection register and the first deflection input of said minor deflection coil, said first minor digital to analog convertor producing an analog signal output proportional to the digital count in said first minor deflection register;

h. a second minor digital to analog convertor;

i. means connecting said second minor digital to analog convertor between the register read output of said second minor deflection register and the second deflection input of said minor deflection coil, said second minor digital to analog convertor producing an analog signal output proportional to the digital count in said second minor deflection register;

j. a first major deflection register and a second major deflection register, each having a pulse input and a register read output;

k. means connected to apply a pulse to the input of said first major deflection register each time said second minor deflection register reaches a predetermined count;

l. means connected to apply a pulse to the input of said second major deflection register each time said first major deflection register reaches a predetermined count;

m. a first major digital to analog convertor;

n. means connecting said first major digital to analog convertor between the register read output of said first major deflection register and the first deflection input of said major deflection coil, said first major digital to analog convertor producing an analog signal output proportional to the digital count in said first major deflection register;

o. a second major digital to analog convertor; and p. means connecting said second major digital to analog convertor between the register read output of said second major deflection register and the second deflection input of said major deflection coil, said second major digital to analog convertor producing an analog signal output proportional to the digital count in said second major deflection register.

13. An image display comprising:

a. beam generating means for producing an energy beam;

b. an energy sensitive target;

c. control means connected to said beam generating means for controlling the deflection of said energy beam to produce a major raster on said target from a plurality of individually spaced minor rasters; and d. intensity control means connected to said beam generating means for varying the intensity of said energy beam between a first level intensity for a predetermined length of time of each minor raster and a second level intensity during the remaining time of each minor raster in response to a minor raster intensity input signal.

14. An image display as set forth in claim 13 wherein intensity control means are connected to said beam generating means for varying the intensity of said energy beam between a first level and a second level intensity during the time of each minor raster in response to a minor raster intensity input signal for each minor raster.

15. An image display comprising:

a. a cathode ray tube having a control grid for controlling the intensity of the tube electron beam, said cathode ray tube having a minor deflection coil and a major deflection coil associated therewith, each of said deflection coils having a horizontal deflection input and a vertical deflection input;

b. means connected to the vertical deflection input of said minor deflection coil to produce a repeating minor vertical sweep of the electron beam of said cathode ray tube;

c. means connected to the horizontal deflection input of said minor deflection coil to produce a minor horizontal deflection of the electron beam of said cathode ray tube upon completion of each minor vertical sweep;

d. means connected to the horizontal deflection input of said major deflection coil to produce a major horizontal deflection of the electron beam of said cathode ray tube each time a predetermined number of minor horizontal deflections have been made;

e. means connected to the vertical deflection input of said major deflection coil to produce a major vertical deflection of the electron beam of said cathode ray tube each time a predetermined number of major horizontal deflections have been made;

f. an intensity control means responsive to intensity input signals; and g. means connecting said intensity control means to the control grid of said cathode ray tube to vary the intensity of the electron beam of said cathode ray tube between a first level intensity and a second level intensity whereby a certain number of said minor vertical sweeps occurring during each predetermined number of minor horizontal deflections will be a first level intensity and the remainder of said minor vertical sweeps occurring during the predetermined number of minor horizontal deflections will be at a second level intensity the number of minor vertical sweeps being at said first or second level intensity during each predetermined number of minor horizontal deflections being determined by the input intensity signal to said intensity control means during each predetermined number of minor horizontal deflections.

16. An image display comprising:

a. a cathode ray tube having a control grid for controlling the intensity of the tube electron beam, said cathode ray tube having minor deflection means and major deflection means associated therewith, each of said deflection means having a first direction deflection input and a second direction deflection input;

b. means connected to the first direction deflection input of said minor deflection means to produce a repeating minor first direction sweep of the electron beam of said cathode ray tube;

c. means connected to the second direction deflection input of said minor deflection means to produce a minor second direction deflection of the electron beam of said cathode ray tube upon completion of each minor first direction sweep;

d. means connected to the second direction deflection input of said major deflection means to produce a major second direction deflection of the electron beam of said cathode ray tube each time a predetermined number of minor second direction deflections have been made;

e. means connected to the first direction deflection input of said major deflection means to produce a major first direction deflection of the electron beam of said cathode ray tube each time a predetermined number of major second direction deflections have been made;

f. intensity control means responsive to intensity input signals; and g. means connecting said intensity control means to the control grid of said cathode ray tube to vary the intensity of the electron beam of said cathode ray tube between a first level intensity and a second level intensity whereby a certain number of said minor first direction sweeps occurring during each predetermined number of minor second direction deflections will be at a first level intensity and the remainder of said minor first direction sweeps occurring during the predetermined number of minor second direction deflections will be at a second level intensity, the number of minor first direction sweeps being at said first or second level intensity during each predetermined number of minor second direction deflections being determined by the input intensity signal to said intensity control means during each predetermined number of minor second direction deflections.

17. An image display as set forth in claim 16 wherein said cathode ray tube is a dark trace storage tube.

18. An image display as set forth in claim 16 wherein said minor deflection means and said major deflection means are electromagnetic deflection coils.

* * * * *